(12) United States Patent
Schmidt

(10) Patent No.: US 9,745,226 B2
(45) Date of Patent: Aug. 29, 2017

(54) METHOD OF TREATING A PRECERAMIC MATERIAL

(71) Applicant: United Technologies Corporation, Hartford, CT (US)

(72) Inventor: Wayde R. Schmidt, Pomfret Center, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 0 days.

(21) Appl. No.: 14/863,635

(22) Filed: Sep. 24, 2015

(65) Prior Publication Data

US 2016/0039720 A1 Feb. 11, 2016

Related U.S. Application Data

(62) Division of application No. 14/203,697, filed on Mar. 11, 2014, now Pat. No. 9,169,163, which is a division of application No. 13/352,584, filed on Jan. 18, 2012, now Pat. No. 8,710,169.

(51) Int. Cl.

| | | |
|---|---|---|
| *C04B 35/622* | (2006.01) | |
| *C04B 35/626* | (2006.01) | |
| *C04B 35/571* | (2006.01) | |
| *C08G 77/56* | (2006.01) | |
| *C08G 77/58* | (2006.01) | |
| *C04B 35/515* | (2006.01) | |
| *C04B 35/56* | (2006.01) | |
| *C04B 35/563* | (2006.01) | |
| *C04B 35/01* | (2006.01) | |
| *C08G 77/60* | (2006.01) | |
| *C08G 77/50* | (2006.01) | |

(52) U.S. Cl.
CPC ...... *C04B 35/62645* (2013.01); *C04B 35/013* (2013.01); *C04B 35/5156* (2013.01); *C04B 35/56* (2013.01); *C04B 35/5603* (2013.01); *C04B 35/563* (2013.01); *C04B 35/5607* (2013.01); *C04B 35/571* (2013.01); *C08G 77/56* (2013.01); *C08G 77/58* (2013.01); *C04B 2235/3205* (2013.01); *C04B 2235/3217* (2013.01); *C04B 2235/3224* (2013.01); *C04B 2235/3231* (2013.01); *C04B 2235/3409* (2013.01); *C04B 2235/3895* (2013.01); *C04B 2235/483* (2013.01); *C08G 77/50* (2013.01); *C08G 77/60* (2013.01)

(58) Field of Classification Search
CPC .............. C04B 35/571; C04B 35/5607; C04B 35/5615; C04B 35/5622
See application file for complete search history.

(56) References Cited

U.S. PATENT DOCUMENTS

| | | | |
|---|---|---|---|
| 4,347,347 A * | 8/1982 | Yajima | C01B 31/301 528/10 |
| 4,359,559 A | 11/1982 | Yajima et al. | |
| 5,030,744 A | 7/1991 | Funayama et al. | |
| 5,071,600 A | 12/1991 | Deleeuw et al. | |
| 5,171,736 A | 12/1992 | Seyferth et al. | |
| 5,277,973 A * | 1/1994 | Yamamura | C04B 35/62272 423/447.1 |
| 5,707,471 A | 1/1998 | Petrak et al. | |
| 5,958,324 A | 9/1999 | Bujalski et al. | |
| 6,395,826 B1 | 5/2002 | Mager et al. | |
| 2003/0114540 A1 | 6/2003 | Mager | |
| 2010/0294230 A1 | 11/2010 | Raj et al. | |

FOREIGN PATENT DOCUMENTS

| | | |
|---|---|---|
| JP | 2011081268 | 4/2011 |
| WO | 2008066060 | 6/2008 |

* cited by examiner

*Primary Examiner* — Kuo-Liang Peng
(74) *Attorney, Agent, or Firm* — Carlson, Gaskey & Olds, P.C.

(57) ABSTRACT

A method of treating a preceramic material includes providing a preceramic polycarbosilane or polycarbosiloxane material that includes a moiety Si—O-M, where Si is silicon, O is oxygen and M is at least one metal that includes at least one transition metal, and thermally converting the preceramic polycarbosilane or polycarbosiloxane that includes the moiety Si—O-M material into a ceramic material.

14 Claims, No Drawings

METHOD OF TREATING A PRECERAMIC MATERIAL

CROSS-REFERENCE TO RELATED APPLICATIONS

This application is a divisional of U.S. patent application Ser. No. 14/203,697, filed Mar. 11, 2014, which is a divisional of U.S. patent application Ser. No. 13/352,584, filed Jan. 18, 2012, now U.S. Pat. No. 8,710,169.

STATEMENT REGARDING FEDERALLY SPONSORED RESEARCH OR DEVELOPMENT

This invention was made with government support under contract number N00014-09-C-0201 awarded by the United States Navy. The government has certain rights in the invention.

BACKGROUND

This disclosure relates to processing of preceramic materials and, more particularly, to treating a preceramic polymer material.

Machine components, such as components of gas turbine engines, are subjected to high temperatures, corrosive and oxidative conditions and elevated stress levels. In order to improve the thermal and oxidative stability of such components, the components may include a thermally resistant ceramic material. There are different ceramic processing techniques for forming ceramic material, including thermal conversion of a preceramic polymer.

SUMMARY

A method of treating a preceramic material according to an example of the present disclosure includes providing a preceramic polycarbosilane or polycarbosiloxane material that includes a moiety Si—O-M, where Si is silicon, O is oxygen and M is at least one metal that includes at least one transition metal, and thermally converting the preceramic polycarbosilane or polycarbosiloxane that includes the moiety Si—O-M material into a ceramic material.

In a further embodiment of any of the forgoing embodiments, thermally converting the preceramic polycarbosilane or polycarbosiloxane material produces a ceramic material having a composition SiOxMzCy, wherein x<2, y>0 and z<1 and x and z are non-zero.

In a further embodiment of any of the forgoing embodiments, the at least one transition metal is selected from the group consisting of titanium, zirconium, hafnium, vanadium, chromium and combinations thereof.

In a further embodiment of any of the forgoing embodiments, the at least one metal includes a refractory metal selected from the group consisting of niobium, tantalum, molybdenum, tungsten, rhenium and combinations thereof.

In a further embodiment of any of the forgoing embodiments, the at least one metal includes a rare earth metal selected from the group consisting of scandium, ytterbium, gadolinium, yttrium, lanthanum, neodymium, dysprosium, lutetium and combinations thereof.

In a further embodiment of any of the forgoing embodiments, the at least one metal includes aluminum.

In a further embodiment of any of the forgoing embodiments, the at least one transition metal is selected from the group consisting of hafnium, vanadium, chromium and combinations thereof.

In a further embodiment of any of the forgoing embodiments, the ceramic material from the thermal converting includes 0.5-20 at. % of the at least one metal.

In a further embodiment of any of the forgoing embodiments, the ceramic material from the thermal converting includes 1-10 at. % of the at least one metal.

A further embodiment of any of the foregoing embodiments includes crushing the ceramic material from the thermal converting to produce a particulate material.

A further embodiment of any of the foregoing embodiments includes thermally treating the particulate material in an inert environment.

A further embodiment of any of the foregoing embodiments includes thermally treating the particulate material in an oxidizing environment.

DETAILED DESCRIPTION OF THE PREFERRED EMBODIMENT

As will be described, disclosed is a method of treating a preceramic material. The method includes modifying a moiety Si—O—R of a polycarbosilane or polycarbosiloxane material with at least one metal (M), where Si is silicon, O is oxygen and R includes an alkyl or aryl moiety, by reaction to substitute R with M to produce a preceramic polycarbosilane or polycarbosiloxane material that includes a moiety Si—O-M (hereafter "preceramic polycarbosilane" or "preceramic polycarbosiloxane" material, respectively).

Upon eventual thermal conversion of the preceramic polycarbosilane or polycarbosiloxane material into a ceramic material, the metal forms a thermally stable glass or crystalline ceramic compound or both in the microstructure. For example, the microstructure of the resulting ceramic material includes regions of glass or crystalline ceramic that include the metal. The glass or crystalline ceramic regions are dispersed within regions of Si—O—C ceramic material. The glass can be a low melting point glass relative to the surrounding Si—O—C ceramic material, which serves to seal microcracks and getter oxygen within the microstructure and thus improves the properties, durability and densification of the ceramic material in oxidizing environments.

In examples based upon boron or aluminum, the glass is borosilicate or aluminosilicate glass, respectively, or both if boron and aluminum are used as the metal. The glass can have a local melting temperature that is lower than the surrounding Si—O—C regions. The low melting point glass regions thereby soften or melt upon exposure to elevated temperatures and are thus able to move into microcracks to seal those areas. Additionally, the presence of the metal also serves to getter oxygen in-situ and thus intercepts oxygen that might otherwise react to form unfavorable or undesired phases.

The selected metal or metals preserve the glass-forming capability and the crystallization behavior of the ceramic material that forms from the preceramic polycarbosilane or polycarbosiloxane material. In this sense, and herein, a glass is defined as an amorphous, generally non-crystalline, oxygen-containing solid with minimal long range structural order. The metal-containing glass of this example may also readily and further oxidize upon exposure to environmental oxidizing conditions, such as the environmental operating conditions within a gas turbine engine, further forming a glassy or crystalline oxide product. Thus, it is to be understood that the composition can change upon oxidation.

As a comparison, Si—O—C alone, without the glass and metal, is subject to detrimental reactions with elements from the operating environmental, such as oxygen, under relatively high environmental temperatures in the presence of moisture. The disclosed method yields a preceramic polycarbosilane or polycarbosiloxane material that can ultimately be thermally converted into a ceramic material having enhanced durability.

In the disclosed method, the moiety Si—O—R of the polycarbosilane or polycarbosiloxane material is reactive such that the metal can be substituted for the alkyl or aryl moiety R to produce the preceramic polycarbosilane or polycarbosiloxane material. Thus, the metal becomes covalently incorporated into the polymeric structure prior to thermal conversion of the material to produce a ceramic material.

In one embodiment, the reaction sequence to substitute the alkyl or aryl moiety R with the metal M includes at least one of a hydrolysis and a condensation reaction.

In one example reaction sequence that includes both a hydrolysis reaction and a condensation reaction, the polycarbosilane or polycarbosiloxane material having the moiety Si—O—R is alkoxy-modified polycarbosilane or polycarbosiloxane and is reacted with a metal alkoxy or aryloxy compound. In the reaction, the metal of the metal alkoxy or aryloxy compound supplants the alkyl or aryl moiety R to produce the moiety Si—O-M in the preceramic polycarbosilane or polycarbosiloxane material.

In embodiments, the alkoxy-modified polycarbosilane material is selected from dimethoxypolycarbosilane, diethoxypolycarbosilane, methoxyethoxypolycarbosilane, isopropoxycarbosilane, butoxycarbosilane or other alkoxy-modified polycarbosilane (available from Starfire® Systems).

In embodiments, the metal alkoxy compound is metal alkoxide. In one example based on aluminum as the metal, the metal alkoxide compound is aluminum isopropoxide. In another example based on boron as the metal, the metal alkoxide compound is boron methoxide. Likewise, for other target metals, the metal or metals are provided in alkoxy or aryloxy compounds to carry out the reaction.

The metal or metals are selected from aluminum, boron, alkaline earth metals, transition metals, refractory metals, rare earth metals and combinations thereof. These metals are glass-forming metals in that they can be incorporated, for example, through covalent bonding, into oxide-based glasses. As an example, the selected metal or metals are glass-forming metals that can readily and further oxidize upon exposure to environmental oxidizing conditions, such as the environmental operating conditions within a gas turbine engine.

In another example, the metal or metals are alkaline earth metals selected from barium, strontium, calcium or magnesium.

In a further example, the metal or metals are transition metals selected from, titanium, zirconium, hafnium, vanadium, chromium and combinations thereof.

In another embodiment, the metal or metals are refractory metals selected from niobium, tantalum, molybdenum, tungsten, rhenium and combinations thereof.

In another embodiment, the metal or metals are rare earth metals, such as scandium, ytterbium, gadolinium, yttrium, lanthanum, neodymium, dysprosium, lutetium and combinations thereof.

In further examples, the preceramic polycarbosilane or polycarbosiloxane material may additionally include impurities that do not affect the properties of the material or elements that are unmeasured or undetectable in the material. In other examples, the preceramic polycarbosilane or polycarbosiloxane material includes any one of the example metals, to the exclusion of any other metals that are present in more than trace amounts as inadvertent impurities. In other examples, the preceramic polycarbosilane or polycarbosiloxane material includes a plurality of the example metals, in any combination, to the exclusion of any other metals that are present in more than trace amounts as inadvertent impurities.

In one embodiment, the reaction to substitute the metal or metals for the alkyl or aryl moiety R in the polycarbosilane or polycarbosiloxane material is conducted within a solvent solution. For example, the starting polycarbosilane or polycarbosiloxane material and a metal organic material of the selected metal or metals are dissolved within a solvent. The selected solvent is compatible with the selected starting polycarbosilane or polycarbosiloxane material and selected metal organic material or materials. That is, the solvent is suitable for dissolving the starting polycarbosilane or polycarbosiloxane material and the metal organic material or materials. For example, the solvent is selected from methanol, hexane, tetrahydrofuran, 2-methyl-1-propanol and combinations thereof. In a further example, the solvent is 2-methyl-1-propanol and is able to readily dissolve the polycarbosilane or polycarbosiloxane material, the metal organic material or materials and water that may be added to the solution to control reaction rate.

In one embodiment, the reaction between the starting polycarbosilane or polycarbosiloxane material and selected metal organic material or materials proceeds without the aid of a catalyst. For example, the metal organic material is aluminum isopropoxide.

In another embodiment, the metal or metals are initially provided as a solid in the solvent. In one example based on aluminum, discrete nano-particles of aluminum are provided in the solvent. The nano-particles may not be soluble in the solvent, but with the addition of isopropyl alcohol to the solution, the aluminum reacts with the isopropyl alcohol to form aluminum isopropoxide. Similarly, other target metals can be provided in solid form with reactive solvents to form metal organic compounds that then react with the starting polycarbosilane or polycarbosiloxane material.

In another embodiment that uses a catalyzed reaction, the starting polycarbosilane or polycarbosiloxane material and the metal organic material or materials that are dissolved within the solvent are provided with a catalyst, such as an acid catalyst, to promote the reaction. As an example, the acid is or includes hydrochloric acid. Optionally, the reaction rate is controlled by controlling the amount of acid added to the solution and an amount of water added in the solution. However, if no acid catalyst is used, the rate of the reaction can alternatively be controlled by controlling the amount of metal organic material or materials that are added in the solution.

In a further embodiment, the reaction rate is controlled by providing atmospheric humidity as the source of water rather than adding water to the solution. In the above examples, all the reactions may be carried out at ambient temperature conditions of 65°-75° F. (18°-24° C.). However, it is to be understood that different temperatures can alternatively be used to further control the rate of reaction.

In a further embodiment, the starting polycarbosilane or polycarbosiloxane material is initially a liquid material that is added to the solvent to form the solution. Upon the reaction or reactions to substitute the metal or metals for the alkyl or aryl moiety R of the polycarbosilane or polycarbosiloxane material, a solid or semi-solid precipitant results. Upon completion or substantial completion of the reaction or reactions, the solvent can then be removed, leaving the solid or semi-solid reaction product. The reaction product is the preceramic polycarbosilane or polycarbosiloxane material that includes the moiety Si—O-M. In one embodiment, the resulting solid or semi-solid is further dried under the vacuum and/or at elevated temperatures to remove or substantially remove all of the solvent.

In a further embodiment, the preceramic polycarbosilane or polycarbosiloxane material is then further processed to produce a ceramic material. As an example, the preceramic polycarbosilane or polycarbosiloxane material is thermally converted into a ceramic material having a composition SiOxMzCy, where Si is silicon, O is oxygen, M is the metal or metals and C is carbon and wherein x<2, y>0 and z<1 and x and z are non-zero. It is to be understood that the metal composition includes the combined composition of all covalently bonded metals M.

In one example of thermally converting the preceramic polycarbosilane or polycarbosiloxane material, the resulting solid or semi-solid from the above-described reaction or reactions is heated to approximately 1000° C. in air, argon or nitrogen and held for approximately 2 hours to produce a ceramic material. It is to be understood that different thermal conversion conditions can be used. However, a combination of heating and atmospheric exposures can be used if desired. In this example, the choice of atmosphere type, exposure time and exposure temperature is used to control the resulting ceramic phase(s). In one example, the ceramic yield is in a range of approximately 60-65 wt. % with regard to the starting mass of the preceramic polycarbosilane or polycarbosiloxane material. In a further example, the metal constitutes approximately 0.5-20 at. % of the resulting ceramic material, and in a further example constitutes approximately 1-10 at. % in the ceramic material.

In another example, the preceramic polycarbosilane or polycarbosiloxane material that results from the above-described reaction or reactions is thermally converted in an argon environment at a temperature of 1000° C. or greater for approximately two hours. The resulting ceramic material is then crushed into a particulate material and further thermally treated for approximately eight hours at a temperature of 1500° C. in either generally inert or oxidizing environments, such as argon or air, respectively.

In another embodiment, the thermal treatment is applied to a mixture of the preceramic polycarbosilane or polycarbosiloxane material that results from the above-described reaction or reactions and another, different preceramic polymer. Alternatively, the ceramic powder that results after the thermal treatment at 1000° C. is mixed with another ceramic powder, such as Si—O—C ceramic material and then further thermally treated at the 1500° C. temperature in either generally inert or oxidizing environments, such as argon or air, respectively.

In a further embodiment, prior to thermal conversion of the preceramic polycarbosilane or polycarbosiloxane material, the material is mixed with other, different preceramic polymers and/or additives. The selected preceramic polymer and/or additives will depend upon the desired resultant ceramic material. In general, the additives can include metallic materials and/or ceramic materials. In one example, the preceramic polycarbosilane or polycarbosiloxane material is mixed with a ceramic material and/or glass or glass ceramic material that includes carbides, oxides, nitrides, borides, silicides, oxycarbides, oxynitrides, carbonitrides, aluminides, silicates, titanates, phosphates, phosphides or combinations thereof. The glass and glass-ceramic materials may include silica, borosilicates, barium aluminosilicates, lanthanum aluminosilicates, strontium magnesium silicates, barium magnesium aluminosilicates, calcium magnesium aluminosilicates and lithium-containing glasses. The metal may include a superalloy material, for example.

In a further embodiment, the preceramic polycarbosilane or polycarbosiloxane material, or mixture with another, different preceramic polymer and/or additive, is then further processed to produce a ceramic material. The ceramic material may be a coating or a layer that is applied onto a component, a filler that is incorporated into a matrix of another material, a matrix that is filled with another, different material, or as a standalone, self-supporting body. In some examples, the ceramic material that is produced from the preceramic polycarbosilane or polycarbosiloxane material may be a combustion chamber, a turbine vane, compressor blade or vane, blade outer air seal, other component within a gas turbine engine or a portion thereof, for example.

Although a combination of features is shown in the illustrated examples, not all of them need to be combined to realize the benefits of various embodiments of this disclosure. In other words, a system designed according to an embodiment of this disclosure will not necessarily include all of the features shown in any one of the FIGURES or all of the portions schematically shown in the FIGURES. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of treating a preceramic material, the method comprising:
   providing a preceramic polycarbosilane or polycarbosiloxane material that includes a moiety Si—O-M, where Si is silicon, O is oxygen and M comprises at least one metal that includes at least one transition metal selected from the group consisting of titanium, zirconium, hafnium, vanadium, chromium and combinations thereof and a refractory metal selected from the group consisting of niobium, tantalum, molybdenum, tungsten, rhenium and combinations thereof; and
   thermally converting the preceramic polycarbosilane or polycarbosiloxane that includes the moiety Si—O-M material into a ceramic material.

2. The method as recited in claim 1, wherein thermally converting the preceramic polycarbosilane or polycarbosiloxane material produces a ceramic material having a composition $SiO_xM_zC_y$, wherein x<2, y>0 and z<1 and x and z are non-zero.

3. The method as recited in claim 1, wherein the at least one metal further includes a rare earth metal selected from the group consisting of scandium, ytterbium, gadolinium, yttrium, lanthanum, neodymium, dysprosium, lutetium and combinations thereof.

4. The method as recited in claim 1, wherein the at least one metal further includes aluminum.

5. The method as recited in claim 1, wherein the at least one transition metal is selected from the group consisting of hafnium, vanadium, chromium and combinations thereof.

6. The method as recited in claim 1, wherein the ceramic material from the thermal converting includes 0.5-20 at. % of the at least one metal.

7. The method as recited in claim 1, wherein the ceramic material from the thermal converting includes 1-10 at. % of the at least one metal.

8. The method as recited in claim 1, further comprising crushing the ceramic material from the thermal converting to produce a particulate material.

9. The method as recited in claim 8, further comprising thermally treating the particulate material in an inert environment.

10. The method as recited in claim 8, further comprising thermally treating the particulate material in an oxidizing environment.

11. A method of treating a preceramic material, the method comprising:

provided a preceramic polycarbosilane or polycarbosiloxane material that includes a moiety Si—O-M, where Si is silicon, O is oxygen and M comprises at least one metal that includes aluminum and at least one transition metal selected from the group consisting of titanium, zirconium, hafnium, vanadium, chromium and combinations thereof; and thermally converting the preceramic polycarbosilane or polycarbosiloxane that includes the moiety Si—O-M material into a ceramic material.

12. A method of treating a preceramic material, the method comprising:

providing a preceramic polycarbosilane or polycarbosiloxane material that includes a moiety Si—O-M, where Si is silicon, O is oxygen and M is at least one metal that includes at least one transition metal;

thermally converting the preceramic polycarbosilane or polycarbosiloxane that includes the moiety Si—O-M material into a ceramic material;

crushing the ceramic material from the thermal converting to produce a particulate material; and thermally treating the particulate material in an oxidizing environment.

13. The method as recited in claim 12, wherein the at least one metal includes a transition metal selected from the group consisting of titanium, zirconium, hafnium, vanadium, chromium and combinations thereof.

14. The method as recited in claim 13, wherein the at least one metal includes a refractory metal selected from the group consisting of niobium, tantalum, molybdenum, tungsten, rhenium and combinations thereof.

* * * * *

UNITED STATES PATENT AND TRADEMARK OFFICE
CERTIFICATE OF CORRECTION

PATENT NO.         : 9,745,226 B2
APPLICATION NO.    : 14/863635
DATED              : August 29, 2017
INVENTOR(S)        : Wayde R. Schmidt Page 1 of 1

It is certified that error appears in the above-identified patent and that said Letters Patent is hereby corrected as shown below:

In the Claims

In Claim 11, Column 7, Line 17; replace "M comprises" with --M is--

Signed and Sealed this
Fourth Day of December, 2018

Andrei Iancu
*Director of the United States Patent and Trademark Office*